United States Patent [19]

Flynn

[11] Patent Number: 4,974,690
[45] Date of Patent: Dec. 4, 1990

[54] ADAPTER FOR DRILLING STRINGS WITH CONTROLLABLE AIR PASSAGE

[75] Inventor: Darcy L. Flynn, Queensland, Australia

[73] Assignee: S&T No 13 Pty. Ltd., Queensland, Australia

[21] Appl. No.: 374,133

[22] Filed: Jun. 30, 1989

[30] Foreign Application Priority Data

Oct. 31, 1988 [AU] Australia ............................ 24479/88

[51] Int. Cl.⁵ .............................................. F21B 21/00
[52] U.S. Cl. ..................................... 175/317; 175/321
[58] Field of Search ................ 175/317, 321, 322, 406, 175/409, 411, 295, 232, 231

[56] References Cited

U.S. PATENT DOCUMENTS

| | | | |
|---|---|---|---|
| 2,869,828 | 1/1959 | McClinton | 175/295 |
| 2,906,493 | 9/1959 | Whitener | 175/317 X |
| 3,371,729 | 3/1968 | Carr | 175/321 X |

FOREIGN PATENT DOCUMENTS

825838  5/1981  U.S.S.R. ............................. 175/322

Primary Examiner—Ramon S. Britts
Assistant Examiner—David J. Bagnell
Attorney, Agent, or Firm—Oblon, Spivak, McClelland, Maier & Neustadt

[57] ABSTRACT

An adaptor for drilling strings has a head, sleeve and mounting block assembly to secure a drill bit to a drilling string. By reverse rotation of the drilling string, the sleeve is movable between a first position, where pressurized air from the drilling string is directed to the drill bit, to a second position, where the air is directed to the drill hole above the adaptor to clear debris from the hole. Teeth at both ends of the assist the adaptor to clear the hole as the drill drill string is rotated and retracted from the hole.

20 Claims, 9 Drawing Sheets

ADAPTER FOR DRILLING STRINGS WITH CONTROLLABLE AIR PASSAGE

BACKGROUND OF THE INVENTION

1. Field of the Invention

THIS INVENTION relates to improvements in drilling equipment.

2. Description of the Prior Art

The operator of a drilling rig must operate the rig under a number of conflicting conditions. As he is paid by the meter depth drilled, a high drilling rate increases his operating profit on the rig. However, a loss of the drilling equipment (e.g. the hammer and/or drilling bit) down the hole can incur a monetary loss of $50,000 (Aust.) plus, easily cancelling the operating profits.

Generally the drilling equipment is lost due to a collapse of the hole wall above the drilling equipment, the dislodged material jamming the drilling equipment down the hole. The collapse may be due to a physical failure in the soil stratum around the hole, or the dislodgement of rocks or soil from the wall of the hole by the drilling equipment as it is withdrawn from the hole or while geological samples are being taken. In certain areas of Western Australia, the clay strata at a depth around the hole swells to "choke" the hole, when contacted by ground water from another level in the hole.

When the hole wall collapses, or the clay chokes the hole, the operator either has to abandon the drilling equipment down the hole or use a second rig to try to recover the equipment by drilling a second hole closely adjacent the first. It will be readily apparent to the skilled addressee that the second rig could suffer the same fate as the first rig.

SUMMARY OF THE PRESENT INVENTION

It is an object of the present invention to provide an adaptor for drilling strings which can enable the downhole equipment to be recovered.

It is a preferred object to provide an adaptor where air can be used to flush the hole.

It is a further preferred object to provide an adaptor which cut its own way out of the hole.

It is a still further preferred object to provide an adaptor which enables grout or the like to be pumped down the hole to stabilize the hole.

It is a still further preferred object to provide an adaptor which can stabilize the drilling strings and which can be used to connect percussion hammers, cross-over-subs, drilling bits and the like to the drilling strings.

Other preferred objects will become apparent from the following description.

One aspect the present invention resides in an adaptor for drilling strings including:
a body having a head screw-threadably mountable on the lower end of a drilling string, having at least one intake passage extending substantially radially through the body and arranged to communicate with a pressure pipe in the drilling string;
a sleeve rotatably mounted on the body and longitudinally movable relative thereto;
a mounting block mountable on the lower end of the sleeve and movable therewith relative to the body and arranged for connecting to drilling equipment and having at least one air intake passage connectable with an air intake port in the drilling equipment; and
air passage means between the intake passage defined between the body and the sleeve arranged to connect the intake passage in the body to the air intake passage in the mounting block;
so arranged that in a first position of the sleeve relative to the body, pressurized air from the pressure pipe is directed through the intake passage in the body, the air passage means and the air intake passage in the mounting block to the air intake port of the drilling equipment; and in a second position of the sleeve relative to the body, the pressure air is directed by the intake passage to the drill hole above the adaptor to clear debris from the drill hole.

The term "drilling equipment" shall be used to include a drilling bit, a cross-over-sub, a percussion hammer or the like drilling equipment.

a second aspect the present invention resides in an adaptor in a drilling string for a percussion hammer or a rotary drill bit including:
a body having a head screw-threadably mountable on the lower end of a drilling string, and having at least one intake passage extending substantially radially through the body and arranged to communicate with the pressure pipe of the drilling string;
a sleeve rotatably mounted on the body and longitudinally movable relative thereto;
a mounting block mountable on the lower end of the sleeve and movable therewith relative to the body and arranged for connection to a percussion hammer or drilling bit and having at least one air intake passage connectable with an air intake port in the percussion hammer or drilling bit;
a first variable volume chamber defined by the body and the sleeve;
a second variable volume chamber defined by the body, sleeve and the mounting block; and
air passage means connecting the first and second chambers;
so arranged that in a first position of the sleeve relative to the body, pressurized air from pressure pipe is directed through the intake passage in the body to the first chamber, along the air passage means to the second chamber, and through the air intake passage in the mounting block to the air intake port in the percussion hammer or the drilling bit, and in a second position of the sleeve relative to the body where the pressure air is directed into the drill hole above the adaptor to clear debris from the drill hole.

A third aspect the present invention resides in an adaptor for reverse circulation drilling strings including:
a body having a head screw-threadably mountable on the lower end of a drilling string, a substantially central exhaust passage to communicate with the exhaust pipe of the drilling string and at least one intake passage extending substantially radially through the body and arranged to communicate with a pressure pipe of the drilling string, the pressure pipe surrounding the exhaust pipe;
a sleeve member rotatably mounted on the body and longitudinally movable relative thereto;
a mounting block mountable on the lower end of the sleeve and movable therewith relative to the body and arranged for connection to drilling equipment and having a substantially central exhaust passage to provide a connection between the exhaust passage in the body and an exhaust port in the drilling equipment and at least one air intake passage connectable with an air intake port in the drilling equipment;

a first variable volume chamber defined by the body and the sleeve;

a second variable volume chamber defined by the body, the sleeve and the mounting block; and air passage means connecting the first and second chambers;

so arranged that in a first position of the sleeve relative to the body, pressure air from the pressure pipe is directed through the intake passage to the first chamber along the air passage means to the second chamber, and through the air intake passage in the mounting block to the air intake port in the drilling equipment, and in a second position, where the pressure air is directed into the drill hole above the adaptor to clear debris from the hole.

Preferably the sleeve and body are provided with complementary helical splines or vertical guides with inclined faces to enable the sleeve to move rotatably and longitudinally relative to the body.

Preferably, in the reverse circulation adaptor, the mounting block has a tubular upper portion slidably received in the exhaust passage of the body to provide communication with that passage and the exhaust passage in the mounting block.

Preferably cutting teeth, which may have hardened (e.g. tungsten-carbide) inserts are provided around the periphery of the upper end of the sleeve to enable the adaptor (and any attached drilling equipment) to be cut free of debris in the hole when the drilling string is rotated and retracted. Similar cutting teeth may also be provided around the lower end of the sleeve.

BRIEF DESCRIPTION OF THE DRAWINGS

To enable the invention to be fully understood, a preferred embodiment will now be described with reference to the accompanying drawings, in which:

FIG. 6A is an exploded, part-sectional view of the adaptor components for the adaptor for a percussion hammer or rotary drill;

DESCRIPTION OF THE PREFERRED EMBODIMENTS

Referring to FIGS. 1 to 5, the adaptor 10 is attached at the lower end of a drilling string 11 (shown in dashed lines in FIGS. 3 and 4) which has inner and outer pipes 12, 13 forming co-axial pressure and exhaust passages 14, 15. A reverse circulation pneumatic hammer 100, with a drill bit 101, is attached to the lower end of the adaptor 10.

The adaptor body 16 has a head 17 with a tapered, screw-threaded bore 18, to enable it to be screwed onto the lower end of the drilling string 11.

Figure 2:
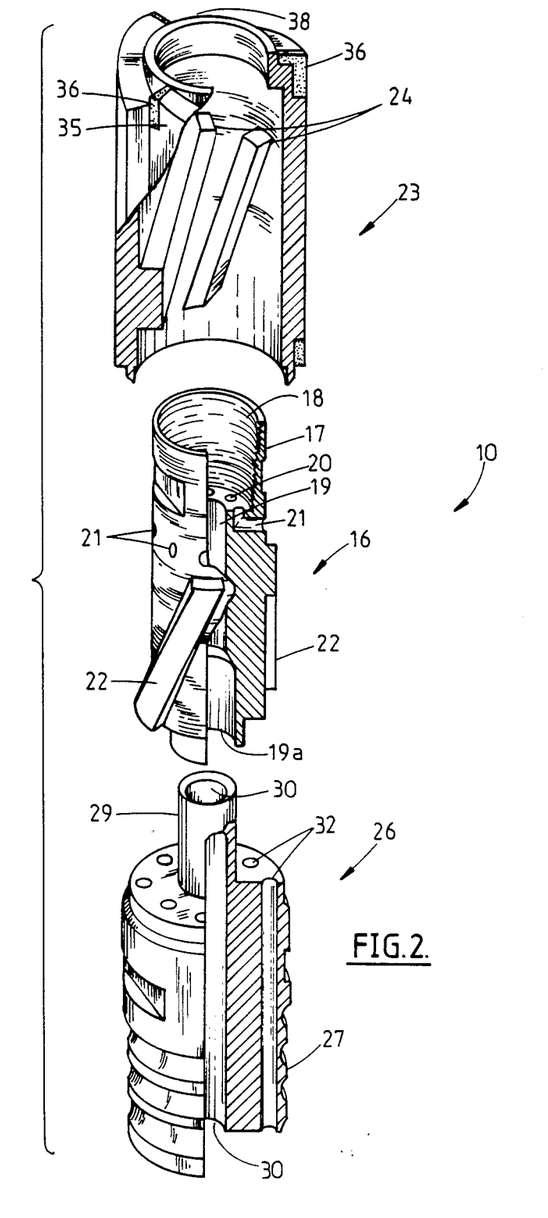
FIG. 2 is an exploded, part-sectional view of the adaptor components.
Figure 3:
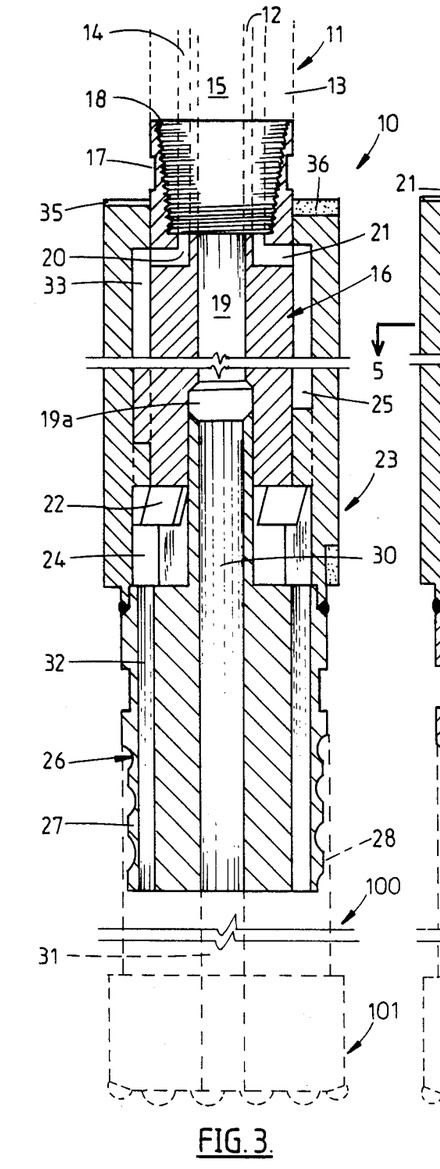
FIG. 3 is a sectional side view of the adaptor in the drilling mode.
Figure 4:
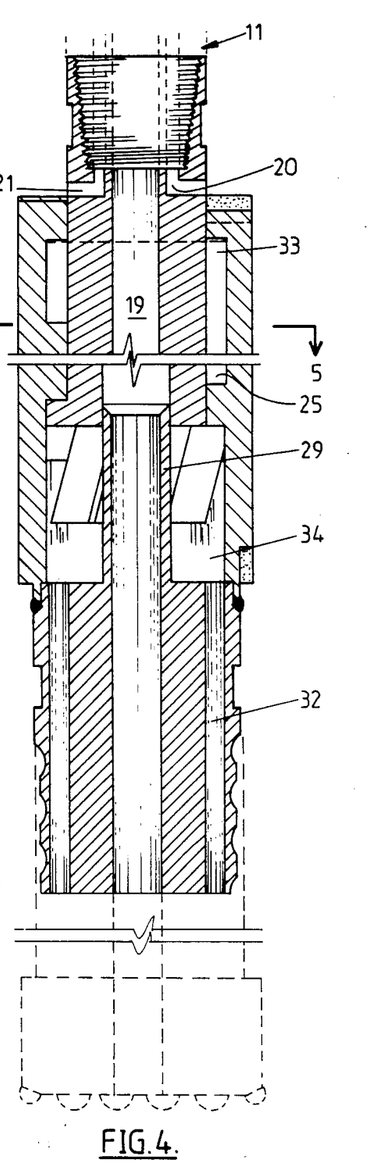
FIG. 4 is a similar view with the adaptor in its flushing or withdrawal mode.

A central exhaust passage 19, with an enlarged lower portion 19a, extends through the body and communicates with the exhaust passage 15.

A plurality of intake ports 20 in the head 17 communicate with the pressure passage 14 and with radially extending intake passages 21.

Three helical splines 22 are provided around, and extend down, the body 16.

Figure 5:
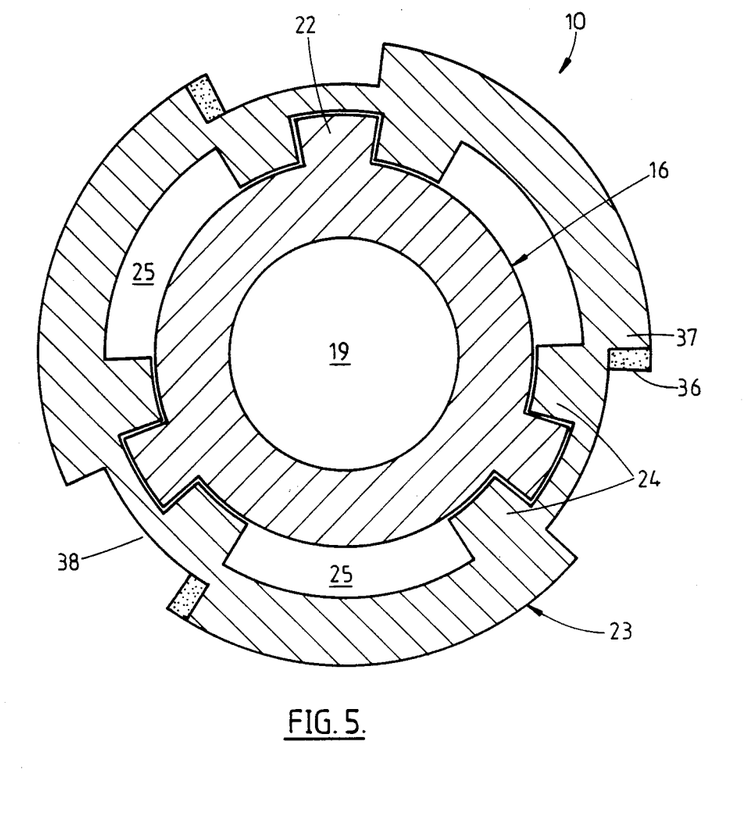
FIG. 5 is a sectional plan view of the adaptor taken on line 5—5 taken on FIG. 4.

The sleeve 23 has pairs of internal helical splines 24 engaged with the splines 22 on the body 16 to enable the sleeve 23 to move rotatably and longitudinally with respect to the body. When the sleeve 23 is mounted on the body 16, intake passages 25 are defined by the sleeve and the body, between the pairs of helical splines 24.

A mounting block 26 is welded to the lower end of the sleeve 23 and has helical splines 27 engageable in a socket 28 at the upper end of the hammer 100. A tubular extension 29 on the mounting block 26 is slidably and rotatably received within the exhaust passage 19a in the body. An exhaust passage 30, connected to the exhaust port 31 in the hammer 100, extends up through the mounting block 26 and communicates with the exhaust passage 19a in the body 16.

A plurality of intake passages 32 extend down through the mounting block 26 and communicate with intake ports (not shown) in the hammer 100.

A first variable passage chamber 33 is defined by the body 16 and sleeve 23 and is connected by the intake passages 25 to a second variable volume chamber 34 defined by the body 16, sleeve 23 and mounting block 26. The chambers 33, 34 provide manifolds interconnecting the intake passages 21 and passages 25, and the passages 25 and intake passages 32 respectively.

Figure 1:
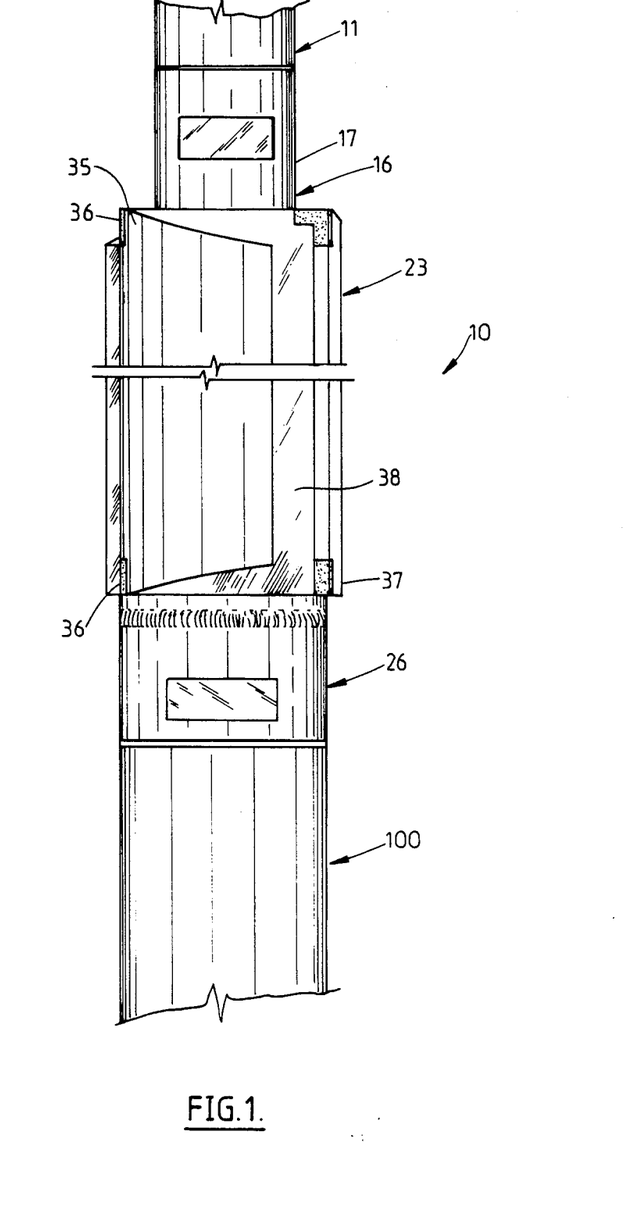
FIG. 1 is a side view of a reverse circulation adaptor a hammer to a drilling string.

A plurality of upwardly directed teeth 35, with tungsten-carbide cutting inserts 36, are provided around the periphery of the upper end of the sleeve 23, and similar teeth 37, with inserts 36, around the periphery of the lower end of the sleeve 23. The upper and lower teeth 35, 37 are aligned and respective teeth are separated by vertical grooves or reliefs 38.

In the drilling mode shown in FIG. 3, the pressurized air from the pressure passage 14 of the drilling string is directed via the intake ports 20 and the intake passages 21 into the first chamber 33, down the air passages 25 to the second chamber 34 and then via air intake passages 32 to the intake ports of the hammer 100. The exhaust air, carrying the drilled earth, travels up the exhaust passages 31, 19a, 19 to the exhaust passage 15 in the drilling string 11.

To clear the hole of any debris e.g. to allow the hammer 100 and bit 101 to be withdrawn from the hole, the drilling string is reversed (or rotation simply stopped)

and the body 16 moves up within the sleeve 23 until the intake passages 21 are exposed to direct the pressurized air up the hole (see FIG. 4). If the debris cannot be cleared with the air, the debris can be loosened with the teeth 35, and then blown up the hole.

Where the wall of the hole has collapsed, the drilling string can be positioned with the hammer 100 and drill bit 101 below the collapsed section. Grout can be pumped down the passage 14 and out the intake passages 21 and up the hole. When the grout has at least partially set, the drilling string can be rotated and raised so that the teeth 35 can cut a smooth bore in the grouted (repaired section) of the hole.

Preferably the diameter of the adaptor 10 is just smaller than the diameter of the drill hole so that the adaptor 10 can act to stabilize the lower end of the drill string 11.

In a modified embodiment not shown, the sleeve 23 can be of smaller diameter than the drill hole and have an enlarged section or periphery flange with an external diameter substantially equal to the diameter of the hole so that the adaptor can act as a stabilizer for the lower end of the drilling string 11.

With the reverse circulation pneumatic percussion hammer 100 attached to the adaptor 10, the adaptor 10 can be in the flushing or withdrawal mode (see FIG. 4) as the hammer 100 is lowered to the bottom of the hole so that the hammer is isolated from the pressurized air. When the bit 101 in the hammer 100 engages the bottom of the hole, the sleeve 23 will move up the body 16 to place the adaptor in the operating mode (see FIG. 3) and air is supplied to the hammer 100 to drive it. If the drilling string 11 is raised, the hammer 100 will be automatically shut off. (The hammer 100 will also be shut off if it drills down a preset depth and the drilling string 11 is not simultaneously advanced down the hole.)

Referring now to FIGS. 6 to 9, the adaptor 110 for a pneumatic percussion hammer or a rotary drilling string, the body 116, sleeve 123 and mounting block are generally similar to those components hereinbefore described.

Figure 6:
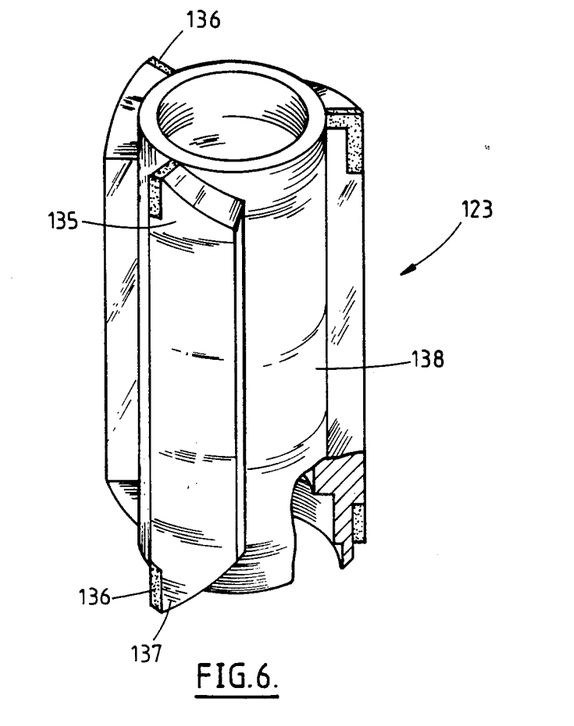
FIG. 6 is a part-sectional isometric view of the sleeve of an adaptor for a percussion hammer or rotary drill.
Figure 7:
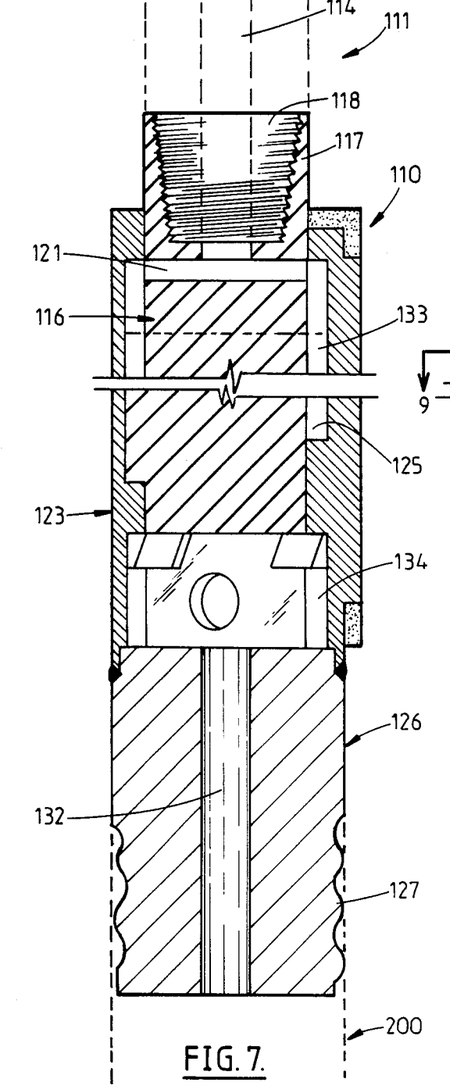
FIGS. 7 and 8 are respective sectional side views of the adaptor in its drilling mode and its flushing or withdrawal mode.
Figure 8:
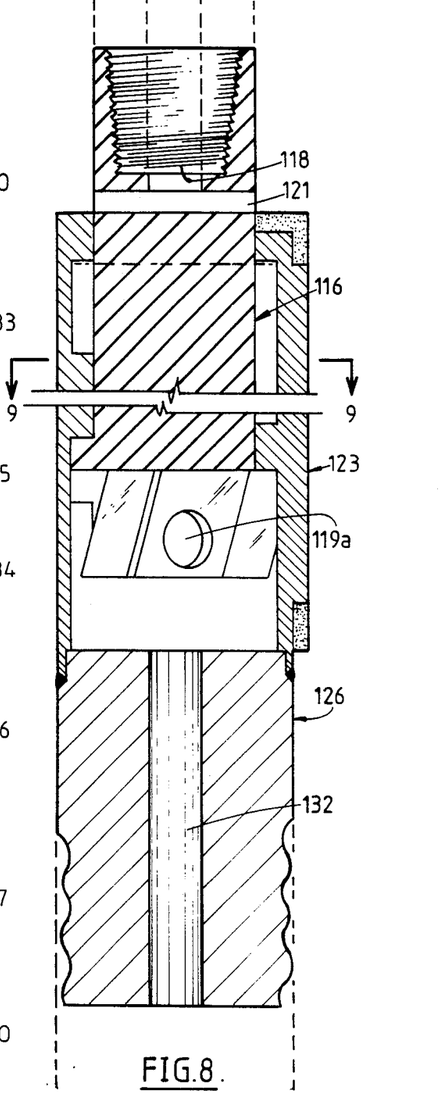
Figure 9:
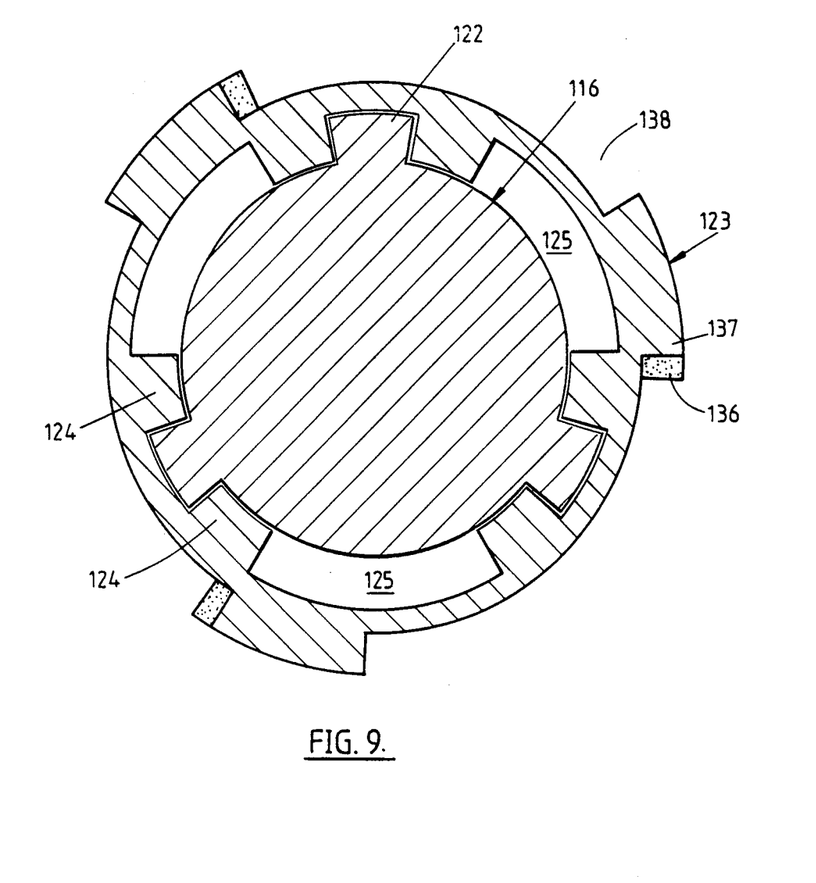
FIG. 9 is a sectional plan view taken on line 9—9 on FIG. 8.

The body 116 has a head 117 with a screw-threaded bore 118 attachable to the lower end of the drilling string 111 which has a central pressure line 114. Intake passages 121 extend radially through the body 116 from the bore 118; while exhaust ports 119a extend radially from an exhaust bore 119 at the lower end of the body.

The sleeve 123 has upper and lower teeth 135, 137, with tungsten-carbide inserts 136 hereinbefore described with reference to the sleeve 23 but the grooves or reliefs 138 are much wider to allow the air and earth to pass up the outside of the adaptor 10 while the drilling is being effected.

The mounting block 126 has helical threads 127 to engage the hammer or drill bit 200 and it has a central air intake passage 132.

The operation of the adaptor 110 is generally as for adaptor 10. As shown in FIG. 7, in the drilling mode, pressurized air from the central pressure line 114 of the drill string 111 is directed via the bore 118 and intake passags 121 to the first chamber 133, down the air passages 125 to the second chamber 134, through the exhaust ports 119a and exhaust passage 119 in the body and down the air intake 132 in the mounting block 126 to the hammer or drilling bit 200. The air and earth then passes up past the adaptor 110, through the grooves or reliefs 138 about the sleeve.

To clear the hole, the rotation of the drill string 111 is stopped and the sleeve 123 moves down relative to the body 116 via the helical splines 122, 124 on the body and sleeve respectively. The air is then directed via the intake pasages 121 to the drill hole to clear the debris as shown in FIG. 8. If necessary the drill string 111 may be rotated to enable the teeth 135 or 137 to cut through the obstruction in the drill hole.

Figure 10:
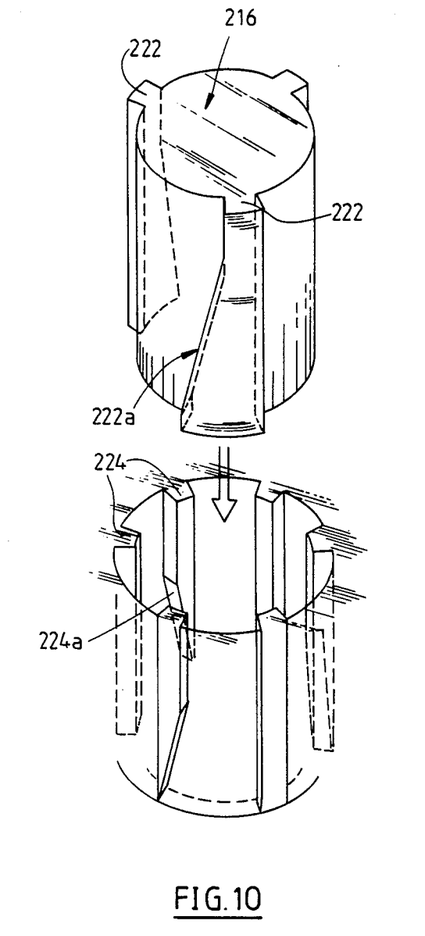
FIG. 10 is an exploded schematic isometric view of the body and sleeve showing alternative vertical guide and ramp means to allow rotational longitudinal movement between the body and sleeve.
Figure 11:
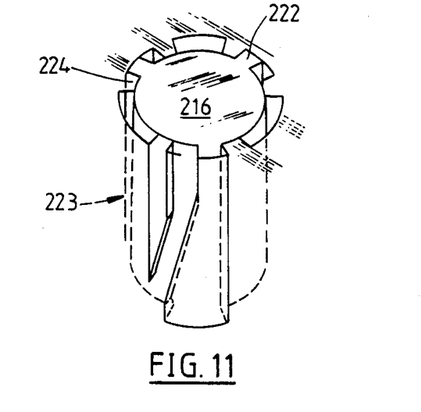
FIGS. 11 and 12 are schematic isometric views showing the sleeve in its respective positions in the drilling and flushing or withdrawal modes.
Figure 12:
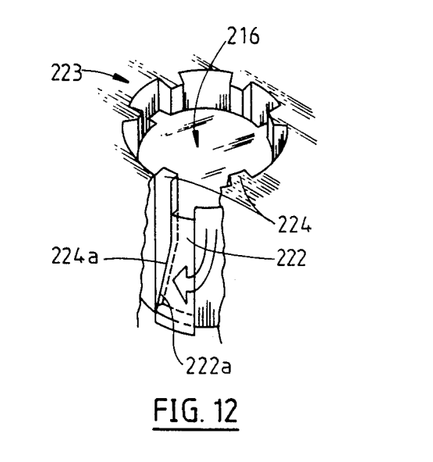

Referring now to FIGS. 10 to 12, the sleeve 223 and body 216 may be modified. The helical splines 22, 122 on the body are replaced by vertical ribs 222 with an inclined (or ramp face) 222a over at least the lower half of one side of the vertical rib 222. The sleeve 223 has respective pairs of vertical ribs 224 where one has an inclined face 224a complementary to the ramp face 222a.

As illustrated in FIGS. 11 and 12, the vertical ribs 222, 224 and their inclined faces 222a, 224a allow the required rotational and longitudinal movement between the body 216 and sleeve 223 to selectively direct the pressurized air to the drilling equipment or to flush the drilling hole as hereinbefore described with reference to FIGS. 1 to 5 and FIGS. 6 to 9 respectively.

It will be readily apparent to the skilled addressee that the present invention enables the drilling equipment to be recovered and it is virtually impossible that it will become jammmed or stuck in the hole and have to be abandoned; provides means to repair or stabilize the hole; provides stability for the drilling string; full flushing of the hole; accurate sample drilling as the adaptor is substantially the same size as the drilling bit; enables fluids, chemicals, additives, grouts to be pumped back up the hole and enables quick change between drilling equipment. For extended life, the adaptor may be provided with an antiwear coating.

Various other advantages of the present invention will be apparent to the skilled addressee, who will appreciate that modifications and variations can be made to the embodiments described without departing from the scope of the present invention defined in the appended claims.

I claim:

1. An adaptor for drilling strings including:
a body having a head screw-threadably mountable on the lower end of a drilling string, having at least one intake passage extending substantially radially thorough the body and arranged to communication with a pressure pipe in the drilling string;
a sleeved rotatably mounted on the body and longitudinally movable relateive thereto;
a mounting block mountable on the lower end of the sleeve and movable therewith relative to the body and arranged for connecting to drilling equipment and having at least one air intake passage connectable with an air intake port in the drilling equipment;
air passage means between the intake passage defined between the body and the sleeve arranged to connect the intake passage in the body to the air intake passage in the mounting block;
wherein that in a first position of the sleeve relative to the body, pressurized air from the pressure pipe is directed through the intake passage in the body, the air passage means and the air intake passage in the mounting block to the air intake port of the drilling equipment; and in a second position of the sleeve relative to the body, the pressure air is directed by the intake passage in the drill hole above the adaptor to clear debris from the drill hole; and a plurality of cutting teeth are provided around the periphery of the upper end of the sleeve to enable the adaptor to cut through any debris in the drill hole when the drilling string is rotated and retracted and wherein the cutting teeth are separated by longitudinal grooves or reliefs extending substantially vertically on the outside of the sleeve and the cutting teeth each have hardened inserts.

2. An adaptor according to claim 1 wherein:

the sleeve and body are provided with complementary helical splines or vertical guides with complementary inclined faces to enable the sleeve to move rotatably and longitudinally relative to the body.

3. An adaptor according to claim 1 wherein:

a plurality of similar cutting teeth are provided around the periphery of the lower end of the adaptor.

4. An adaptor according to claim 3 wherein:

the cutting teeth are separated by longitudinal grooves or reliefs extending substantially vertically on the outside of the sleeve; and the cutting teeth each have hardened inserts.

5. An adaptor according to claim 1 wherein:

the external diameter of the sleeve, or of an enlarged portion of peripheral flange on the sleeve, is just less than the diameter of the drill hole to enable the adaptor to act as a stabilzier for the lower end of the drill string in the drill hole.

6. An adaptor in a drilling string for a percussion hammer or a rotary drill bit including:

a body having a head screw-threadably mountable on the lower end of a drilling string, and having at least one intake passage extending substantially radially through the body and arranged to communicate with pressure pipe of the drilling string;

a sleeve rotatably mounted on the body and longitudinally movable relative thereto;

a mounting block mountable on the lower end of the sleeve and movable therewith relative to the body and arranged for connection to a percussion hammer or drilling bit and having at least one air intake passage connectable with air intake port in the percussion hammer or drilling bit;

a first variable volume chamber defined by the body and the sleeve;

a second variable volume chamber defined by the body, sleeve and the mounting block; and air passage means connecting the first and second chambers;

so arranged that in a first position of the sleeved relative to the body, pressurized air from pressure pipe is directed through the intake passage in the body to the first chamber, along the air passage means to the second chamber, and through the air intake passage in the mounting block to the air intake port in the percussion hammer or the drilling bit, and in a second position of the sleeve relative to the body where the pressure air is directed into the drill hole above the adaptor to clear debris from the drill hole.

7. An adaptor according to claim 6 wherein:

the sleeve and body are provided with complementary helical splines or vertical guides with complementary inclined faces to enable the sleeve to move rotatably and longitudinally relative to the body.

8. An adaptor according to claim 6 wherein:

a plurality of cutting teeth are provided around the periphery of the upper end of the sleeve to enable the adaptor to cut through any debris in the drill hole when the drilling string is rotated and retracted.

9. An adaptor according to claim 8 wherein:

a plurality of similar cutting teeth are provided around the periphery of the lower end of the adaptor.

10. An adaptor according to claim 9 wherein:

the cutting teeth are separated by longitudinal grooves or reliefs extending substantially vertically on the outside of the sleeve; and the cutting teeth each have hardened inserts.

11. An adaptor according to claim 8 wherein:

the cutting teeth are separated by longitudinal grooves of reliefs extending substantially vertically on the outside of the sleeve; and the cutting teeth each have hardened inserts.

12. An adaptor according to claim 6 wherein:

the external diameter of the sleeve, or of an enlarged portion or peripheral flange on the sleeve, is just less than the diameter of the drill hole to enable the adaptor to act as a stabilzier for the lower end of the drill string in the drill hole.

13. An adaptor for reverse circulation drilling strings including:

a body having a head screw-threadably mountable on the lower end of a drilling string, a substantially central exhaust passage to communicate with the exhaust pipe of the drilling string and at least one intake passage extending substantially radially through the body and arranged to communicate with a pressure pipe of the drilling string, the pressure pipe surrounding the exhaust pipe;

a sleeve member rotatably mounted on the body and longitudinally movable relative thereto;

a mounting block mountable on the lower end of the sleeve and movable therewith relative to the body and arranged for connection to drilling equipment and having a substantially central exhaust passage to provide a connection between the exhaust passage in the body and an exhaust port in the drilling equipment and at least one air intake passage connectable with an air intake port in the drilling equipment;

a first variable volume chamber defined by the body and the sleeve;

a second variable volume chamber defined by the body in the sleeve and the mounting block; and air passage means connecting the first and second chambers;

so arranged that in a first position of the sleeve relative to the body, pressure air from the pressure pipe is directed through the intake passage to the first chamber along the air passage means to the second chamber, and through the air intake passage in the mounting block to the air intake port in the drilling equipment, and in a second position, where the pressure air is directed onto the drill hole above the adaptor to clear debris from the hole.

14. An adaptor according to claim 13 wherein:

the mounting block has a tubular upper portion slidably received in the exhaust passage of the body to provide communication with that passage and the exhaust passage in the mounting block.

15. An adaptor according to claim 13 wherein:

the sleeve and body are provided with complementary helical splines or vertical guides with complementary inclined faces to enable the sleeve to move rotatably and longitudinally relative to the body.

16. An adaptor according to claim 13 wherein:
a plurality of cutting teeth are provided around the periphery of the upper end of the sleeve to enable the adaptor to cut through any debris in the drill hole when the drilling string is rotated and retracted.

17. An adaptor according to claim 16 wherein:
a plurality of similar cutting teeth are provided around the periphery of the lower end of the adaptor.

18. An adaptor according to claim 17 wherein:
the cutting teeth are separated by longitudinal grooves or reliefs extending substantially vertically on the outside of the sleeve; and
the cutting teeth each have hardened inserts.

19. An adaptor according to claim 16 wherein:
the cutting teeth are separated by longitudinal grooves or reliefs extending substantially vertically on the outside of the sleeve; and
the cutting teeth each have hardened inserts.

20. An adaptor according to claim 13 wherein:
the external diameter of the sleeve, or of an enlarged portion or peripheral flange on the sleeve, is just less than the diameter of the drill hole to enable the adaptor to act as a stabilzier for the lower end of the drill string in the drill hole.

* * * * *